Feb. 14, 1928.

J. E. CONDREN 1,658,801

NASAL CLEANING DEVICE

Filed Oct. 20, 1924

Inventor
James E Condren
By W. E. Lord
Attorney

Patented Feb. 14, 1928.

1,658,801

UNITED STATES PATENT OFFICE.

JAMES E. CONDREN, OF ERIE, PENNSYLVANIA.

NASAL-CLEANING DEVICE.

Application filed October 20, 1924. Serial No. 744,629.

This invention is designed to facilitate the cleaning of the nasal cavity. It is important that this be done readily and without injury to the membranes. This device accomplishes this simply and in an efficient manner.

The invention is illustrated in the accompanying drawings as follows:—

Figure 1:
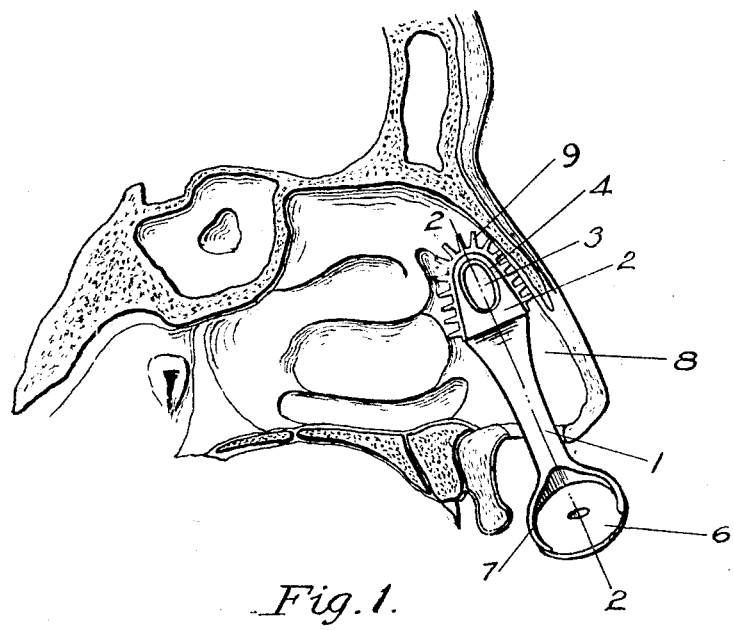
Fig. 1 shows a sectional view of a nasal cavity indicating the operation of the device.
Figure 2:
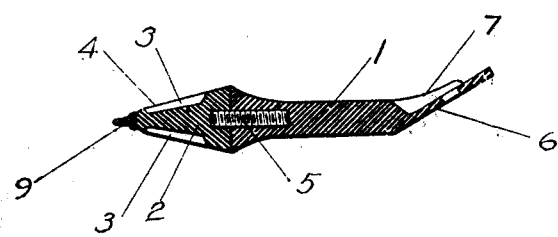
Fig. 2 is a central sectional view on the line 2—2 in Fig. 1.

1 marks the handle. This is ordinarily made of hard rubber. A cleaning projection 2 is arranged on the handle. This is formed of very soft rubber and has the exudate receiving cavities 3 at each side, the rib 4 surrounding the exudate cavities and assisting in the removal of the exudate. The base of the projection abuts against the end of the handle and is secured to the handle by a screw stud 5 which may be formed in place in the projection.

The handle has a finger hold 6 at its outer end and this is arranged at an angle to the handle so that it may be readily grasped by the user. It is surrounded by a rib 7 which facilitates the holding of the device between the thumb and finger.

The projection is formed to conform in a general outline to the portions of the nasal cavity 8 so that there is less chance for bruising the sensitive membranes of the passages.

In some instances it may be desirable to provide the edge of the projection with a soft rubber brush 9. This extends around the edge and may be utilized as in the manner of a brush for loosening the exudate.

What I claim as new is:—

1. A nasal cleaning device, comprising a handle, and a projecting soft rubber cleaning blade, said blade having an exudate receiving cavity at each side with marginal ribs.

2. A nasal cleaning device, comprising a handle, a soft rubber cleaning blade having an exudate receiving cavity and a surrounding rib, and brush projections around the surrounding rib.

3. A nasal cleaning device comprising a handle and a projecting soft rubber cleaning blade, said blade being thin as compared with its width and having converging edges conforming to the shape of the nasal cavity and having an exudate receiving cavity on each side of the blade, each cavity being formed with a marginal rib.

In testimony whereof I have hereunto set my hand.

JAMES E. CONDREN, D. D. S.